United States Patent [19]

Howard, Jr.

[11] 4,104,243
[45] Aug. 1, 1978

[54] METHOD OF PREPARING LOW VISCOSITY/INORGANIC FILLER

[75] Inventor: Edward G. Howard, Jr., Hockessin, Del.

[73] Assignee: E. I. Du Pont de Nemours and Company, Wilmington, Del.

[21] Appl. No.: 582,816

[22] Filed: Jun. 2, 1975

Related U.S. Application Data

[63] Continuation-in-part of Ser. No. 424,819, Dec. 14, 1973, abandoned.

[51] Int. Cl.² .................. B01J 31/02; C08K 9/10
[52] U.S. Cl. ........................... 260/42.14; 252/428; 252/429 B; 252/429 C; 252/430; 260/42.18; 260/42.46; 260/42.53
[58] Field of Search ............ 260/42.53, 42.14, 42.18; 252/428, 430, 429 B, 429 C

[56] References Cited

U.S. PATENT DOCUMENTS

| | | | |
|---|---|---|---|
| 2,912,421 | 11/1959 | Juveland et al. | 260/94.9 D |
| 3,297,466 | 1/1967 | Herman et al. | 260/42.53 |
| 3,300,329 | 1/1967 | Orsino et al. | 260/42.53 |
| 3,563,939 | 2/1971 | Stevens | 260/42.53 |
| 3,578,629 | 5/1971 | McManimie | 260/42.53 |
| 3,674,764 | 7/1972 | Iwasaki et al. | 260/94.9 D |

*Primary Examiner*—James H. Derrington

[57] ABSTRACT

Described is a process for preparing low viscosity inorganic filler dispersions which comprises dispersing a large amount of finely divided inorganic filler compound as a slurry in a hydrocarbon diluent at all times in the presence of certain organoaluminum compounds. This process is particularly useful for preparing dispersions used in the preparation of polyolefin/inorganic filler compositions, especially polyolefin/inorganic filler compositions prepared in the presence of a catalytic transition metal compound.

19 Claims, No Drawings

METHOD OF PREPARING LOW VISCOSITY/INORGANIC FILLER

CROSS-REFERENCE TO RELATED APPLICATION

This is a continuation-in-part of copending application Ser. No. 424,819 filed Dec. 14, 1973, now abandoned.

BACKGROUND OF THE INVENTION

1. Field of the Invention

This invention relates to a process for preparing low viscosity inorganic filler compound dispersions and to the use of these dispersions in the preparation of polyolefin/inorganic filler compositions.

2. Description of the Prior Art

Much work has been done in the past in the area of preparing filler polyolefin compositions. In the case of highly filled polyolefin compositions, one of the economic limitations on the process is the maximum concentration of inorganic filler compound which can be used and still have the reaction slurry remain stirrable and pumpable. This limitation on the amount of filler dictates a limitation on the amount of product which can be produced in a given piece of equipment. Accordingly, it would be desirable to provide a process in which high concentrations of inorganic filler compound can be dispersed in a suitable diluent without encountering high viscosities.

Prior art processes in which a large amount of filler is present during olefin polymerization include the following:

1. Rine Kruger in U.S. Pat. No. 3,092,438 discloses in Example 4 mixing 100 grams of bentonite, 5 cc of ethylene aluminum sesquibromide and 3.6 cc of tetra-2-ethylhexyl titanate in 500 cc of heptane. The mixture was stirred and propylene gas was bubbled through the solution. This example has been repeated and an increase in viscosity was observed due to the presence of ethylene aluminum sesquibromide.

2. D. F. Herman et al. in U.S. Pat. No. 3,297,466 disclose a continuous process for polymerizing 1-olefins directly onto the surface of various particulate materials. Slurry concentrations up to the pumpable limit are contemplated. The filler is first mixed with the diluent and then pumped through a pipe into which is added a catalytic transition metal compound and a catalytic organometallic reactant.

3. J. A. Orsino et al. in U.S. Pat. No. 3,300,329 disclose in Examples 1, 12, 13, 16, 20 and 21 suspension of large amounts of various particulate metals in a hydrocarbon diluent. Titanium tetrachloride is added, and the reaction is agitated for a period of time. Trialkylaluminum is then added, followed by addition of the olefin.

4. R. J. McManimie in U.S. Pat. No. 3,578,629 discloses in Example 1 the preparation of a catalyst by first reacting titanium tetrachloride and diisobutylaluminum hydride. A large amount of wollastonite is stirred in hexane containing an organosilane coupler compound, and the prereacted catalyst mixture is added to the slurry, followed by the addition of ethylene.

SUMMARY OF THE INVENTION

In accordance with the present invention a process for preparing high solids, inorganic filler compound dispersions at all times under low viscosity conditions has been discovered which comprises dispersing at least about 9 weight/volume percent of finely divided inorganic filler compound as a slurry in a hydrocarbon diluent at all times in the presence of about 0.01 to 2% by weight, based on the inorganic filler compound, of an organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to about 10 carbon atoms.

This process is particularly useful for preparing polyolefins in the presence of high solids inorganic filler compound dispersions at all times under low viscosity conditions which comprises (a) dispersing at least about 9 weight/volume percent of finely divided inorganic filler compound as a slurry in a liquid hydrocarbon diluent at all times in the presence of about 0.01 to 2% by weight, based on the inorganic filler compound, of an organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, contain 1 to about 10 carbon atoms, said dispersion containing a transition metal compound component of a coordination polymerization catalyst system, (b) adding to the dispersion an olefin selected from the group consisting of 1-alkenes of 2 to about 10 carbon atoms and mixtures thereof with agitation at a temperature from about 0° to about 250° C and a pressure from atmospheric to about 500 atmospheres, and (c) isolating the product.

DETAILED DESCRIPTION OF THE INVENTION

It has been discovered in accordance with this invention that high solids dispersions of finely divided inorganic filler compounds in hydrocarbon diluents can be prepared by dispersing the filler at all times in the presence of an organoaluminum compound whereby the dispersion can be readily pumped and stirred at all times. These dispersions are useful in the polymerization of 1-alkenes in the presence of inorganic filler compounds.

Any finely divided inorganic filler compound can be used in accordance with this invention. By "inorganic filler compound" is meant a solid compound which does not contain carbon except in the form of carbonate. The term "compound" is used to exclude finely divided metal since these particles do not present a viscosity problem. Suitable inorganic filler compounds include minerals and synthetic compounds. Suitable minerals include, for example, alumina, alumina hydrates such as alumina trihydrate and the like; metal phosphates and sulfates such as insoluble calcium phosphates, calcium sulfate, magnesium sulfate and barium sulfate; silicas ($SiO_2$) such as sand, diatomaceous earth and pumice; metal carbonates such as barium carbonate, calcium carbonate and zinc carbonate; metal oxides such as titania (e.g., rutile and anatase), zinc oxide, antimony oxide, and iron oxide (e.g., magnetite $FeO \cdot Fe_2O_3$); water-insoluble silicates; and natural mixtures of these compounds such as slate. Other suitable inorganic fillers include synthetic compounds such as silicas; carbonates; borates such as aluminum borate; glass powder and fibers; silicates such as "Silene" L, a precipitated, hydrated calcium silicate, and other silica gel; and titanates such as "Fybex", an acicular potassium titanate.

By "alumina hydrates" is meant aluminas of the formula $Al_2O_3.xH_2O$ in which $x$ is about 1.5–3.0. By "alumina trihydrates" is meant aluminas of the formula $Al_2O_3.xH_2O$ in which $x$ is about 2.5–3.0.

By "water-insoluble silicates" is meant silicates which are either completely insoluble or so close to being completely insoluble that the small amount of solubility does not prevent the advantages of this invention from being realized. Typical water-insoluble silicates include calcium silicates ($CaSiO_3$) such as wollastonite; magnesium silicates such as talc and asbestos; magnesium calcium aluminum silicates $[(Mg.Ca)O.Al_2O_3.5SiO_2.nH_2O]$ such as montmorillonite and serpentine; lithium aluminum silicates such as spodumene $[(Li,Na)_2Al_2Si_4O_{12}]$; potassium aluminum silicates such as feldspar ($K_2O.Al_2O_3.6SiO_2$) and mica ($K_2O.3Al_2O_3.6SiO_2.2H_2O$); magnesium iron silicates such as olivine $[(Mg,Fe)_2SiO_4]$; aluminum silicates ($Al_2O_3.SiO_2$) such as sillimanite and kyanite; and aluminum silicate clays of the formula $Al_2O_3.xSiO_2.nH_2O$ where $x$ is 1 to 5 and $n$ is 0 to 4 such as kaolinite, attapulgite, fuller's earth and bentonite.

These fillers may be in a variety of shapes including acicular and plate like particles and may have a weight-average equivalent spherical particle diameter of less than about 100 $\mu$ and preferably less than about 50 $\mu$. The term "equivalent spherical particle diameter" is used because not all of the useful fillers are spherical in shape and thus do not have simple diameters. This term means that the particle has a diameter equivalent to the diameter of a sphere having the same volume.

The diluents which are used in the process of this invention are inert liquid hydrocarbons of 3 to about 16 carbon atoms. Suitable diluents include saturated aliphatic, saturated alicyclic and aromatic hydrocarbons. While the liquid cyclic and acyclic hydrocarbons of about 5 to about 10 carbons such as pentane, hexane, heptane, octane, decane, cyclohexane, benzene, toluene, xylene, and tetraline are preferred, the lower boiling propanes and butanes and the higher boiling tridecanes and hexadecanes can also be used.

The dispersions prepared in accordance with this invention contain at least about 9 weight/volume percent of finely divided inorganic filler compound. This is the level of filler at which high viscosity problems are encountered and at which this invention is beneficial. Preferably the dispersions contain at least about 15, and more preferably at least about 20 weight/volume percent of filler. The term "weight/volume percent", as used throughout the specification and claims, refers to grams of solid added to 100 cubic centimeters of liquid.

The organoaluminum compounds which are useful in preparing low viscosity dispersions in accordance with this invention include any of the trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, have 1 to about 10 carbons. Suitable compounds include trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, diisobutylaluminum chloride, propylaluminum dibromide, and the like. Polymeric hydrocarbylaluminums such as aluminum-isoprene polymers are described in U.S. Pat. No. 3,149,136. The trialkylaluminums and dialkylaluminum hydrides are preferred.

The dispersion should contain at all times at least about 0.01 percent by weight, based on the filler, of an organoaluminum compound to avoid high viscosities. More than about 2 percent of organoaluminum compound generally imparts no further viscosity reducing benefit. Preferably the organoaluminum compound is present in the amount of about 0.05 to 1 percent.

Slurries of the filler in the hydrocarbon diluent containing no organoaluminum compound are quite viscous even at the minimum filler content level. The presence of the organolauminum compound in the slurry avoids the high viscosity which would otherwise be encountered. For example, the viscosity of a typical system containing the orgnoaluminum compound might be about 100 to 500 centipoises as compared with about 2,000 to about 7,000 cp for the same system without the organoaluminum compound. The combination of organoaluminum and vigorous stirring results in the filler being thoroughly dispersed in the diluent thus providing a fine grained, free-flowing dispersion.

The dispersions prepared in accordance with this invention are especially useful in polymerizing olefins in the presence of inorganic filler compounds. Polyolefins which may be made using these dispersions include homopolymers of 1-alkenes of 2 to about 10 carbons and copolymers of two or more such 1-alkenes with each other. Suitable monomers include ethylene, propylene, 1-butene, 1-pentene, 3-methyl-1-butene, 4-methyl-1-pentene, 1-hexene, 1-octene and 1-decene. Particularly preferred polyolefins are polyethylene, polypropylene and copolymers of ethylene with up to about 15% by weight of one or more 1-alkene of 3 to about 10 carbons. Other monomers known to be reactive in coordination polymerization reactions, for example, linear, nonconjugated diolefins such as 1,4-hexadiene, 1,6-octadiene, dicyclopentadiene, norbornene and norbornene derivatives such as ethylidenenorbornene, may also be added in small amounts.

When the filler is to be used in an olefin polymerization reaction, it must first be freed of gaseous oxygen, water that is not molecularly bound, and other polar impurities that interfere with the polymerization reaction. This is readily accomplished by sweeping the filler with an inert atmosphere such as nitrogen. The filler is then immediately dispersed in a diluent.

When used in an olefin polymerization, the diluent should be anhydrous and preferably is made so by passing it through highly absorptive alumina such as a Woelm acid alumina column immediately prior to use. The liquid diluents can also be freed of contaminants such as oxygen and water by treatment with traces, e.g., about 0.05%, based on the weight of diluent, of the organoaluminum compound used in the polymerization. This, along with the acid aluminum treatment, ensures maximum avoidance of moisture and other impurities.

When the dispersions prepared in accordance with the invention are used in the polymerization of olefins, the organoaluminum compound serves as one component of the coordination catalyst system. In this case the polymerization is also carried out in the presence of a catalytic transition metal compound which serves as the other component of the coordination catalyst system. By "transition metal" is meant a typical coordination catalyst component metal such as those of Group IV A, V A or VI A of the Periodic Chart of the Elements published in *Advanced Inorganic Chemistry* by F. A. Cotton and G. Wilkinson, Interscience Publishers (1972). These metals are titanium, zirconium, hafnium, vanadium, niiobium, tantalum, chromium, molybdenum and tungsten.

Any of the transition metal compound components of coordination catalyst systems disclosed in the prior art as being suitable for olefin polymerization are suitable for use in accordance with this invention. Suitable transition metal compounds include titanium tetrachloride, tetramethyl titanate, tetraethyl titanate, tetrapropyl titanate, tetraisopropyl titanate, chromium nitrate, chromium sulfate, chromium chloride, chromium bromide, chromium iodide, chromium acetate, chromium oxalate, chromium octoate, chromium naphthenate, fumaratochromium nitrate, methacrylatochromium hydroxide, methacrylatochromium chloride, tetrabenzylzirconium, tetrabenzyltitanium, tetrabenzylhafnium, tetraneophylzirconium, tetraneophylchromium, tetraneophyltitanium, tetrakis(p-isopropylbenzyl)titanium, tetratolyltitanium, tetrakis(tetraethylbenzyl)titanium, tetramethyltitanium, tetraneopentylzirconium, tetraneopentyltitanium, tetraneopentylhafnium, tetrakis(p-methylbenzyl)zirconium, tetrakis(1-naphthylmethyl)titanium, tetrakis(trimethylsilylmethyl)zirconium, tribenzylzirconium chloride, tris($\pi$-allyl)zirconium bromide, tris($\pi$-methallyl)titanium chloride, tetrakis($\pi$-allyl)hafnium, tetrakis($\pi$-allyl)chromium, tetrakis($\pi$-allyl)niobium, tetrakis(2,4-pentanedionato)zirconium, tetrakis(2,4-pentanedionato)titanium, tetrakis(dimethylamino)titanium, tetrakis(diethylamino)vanadium, and the like.

The transition metal compound should be present in an amount which provides about 0.01 to about 2% and preferably about 0.1 to about 1% by weight of transition metal based on the filler. The transition metal compound may be added to the polymerization reaction, added to the filler, or may be a naturally occurring component of the filler as in the case of the naturally occurring titanium compounds in kaolin, attapulgus and fuller's earth type clays. The transition metal compound may also be premixed with an excess of the organoaluminum compound thereby forming a complex which is added to the medium. In this case the excess organoaluminum compound and the organoaluminum compound in the complex function to reduce the viscosity. Preferably the transition metal compound is interacted at the surface of the finely divided inorganic filler compound whereby polymerization takes place at the surface of the filler thus providing a particulate product containing particles composed of both polyolefin and filler.

The polymerization reaction may be carried out at temperatures of about 0° to about 250° C. Polymerization temperatures below that at which the diluent swells the polyolefin are preferred since swelling greatly increases the viscosity of the reaction mixture and makes agitation difficult or impossible unless low concentrations of materials are used. For practical reasons, polymerizations should be run at temperatures not in excess of about 100° C when pure alkanes are used. When strong polyolefin solvents such as tetralin and the xylenes are used, even lower temperatures, such as at about 50° C and below, should be used. Preferably temperatures of about 25° to about 100° C are used, and most preferably about 50° to about 90° C.

Polymerization is readily carried out at a pressure from atmospheric to about 500 atmospheres. Pressures in the lower range are generally preferred, and about 3 to about 100 atmospheres are most satisfactory. The course of the polymerization reaction is followed by noting the change in weight of the supply vessel containing the olefin. The supply vessel is used to maintain the pressure in the reaction vessel. The duration of the polymerization reaction may vary from about 1 minute to about 24 hours.

Intimate mixing of the finely divided fillers is necessary if finely divided, uniform polyolefin/filler compositions are desired. Agitation during polyermization controls both particle size and uniformity of composition. Strong agitation, as achieved with very rapid stirring, gives a fine-grained, free-flowing product. This is best achieved by use of an autoclave equipped with an efficient stirrer such as one having a magnetic drive.

the polymerization taught herein using the dispersion prepared in accordance with this invention provides highly filled polyolefin compositions which may have relatively high molecular weight polyolefin. The polyolefin preferably has an inherent viscosity of at least about 1 and most preferably at least about 4.

The inherent viscosities referred to herein are determined by measuring the viscosity of a 0.05 weight-/volume percent solution of polyolefin in 1,2,4-trichlorobenzene containing 1.33 gram per liter of butylated hydroxytoluene antioxidant at 130° C. The inherent viscosity is calculated using the following equations:

$$\text{Relative Viscosity} = \frac{\text{Time of solution}}{\text{Time of solvent flow}}$$

$$\text{Inherent Viscosity} = \frac{\text{natural log of relative viscosity}}{\frac{w}{v} \text{ \%polymer concentration}}$$

Due to the presence of the organoaluminum compound, the free-flowing products obtained from the olefin polymerization reaction are essentially static-free. This quality gives a distinct process advantage in that there is no adherence of the powder to the polymerization reactor walls. By "static-free" is meant powder compositions which flow freely through a glass funnel having an inside stem diameter of 1 centimeter.

The finely divided products obtained from the olefin polymerization reaction may readily be formed into articles by various combinations of heat and pressure. In some cases the articles may be formed by simultaneously applying heat and pressure. In other cases articles are formed by first pressing and then heating. In still other cases, articles may be formed by first heating and then pressing. Moderate temperatures in the range of about 125° to about 210° C and positive pressures in the range of about 10 to about 25,000 psi or more are suitable for these operations. Typical forming operations include compression molding, and cold compressing and sintering. These compositions can be formed into sheets, films and molded articles.

EXAMPLES OF THE INVENTION

The following examples illustrate the novel process of this invention. In these examples, the organoaluminum compounds were added as a dilute solution in a hydrocarbon solvent. All percentages are by weight unless otherwise specified. For the tensile strength data, test bars of Type I and Type V of ASTM test method 638 (1972) and bars prepared according to ASTM test method 638-44% were used.

EXAMPLE 1

(A) A glass food blender cup that had been dried and deoxygenated with nitrogen purge was charged with 500 ml of dry and deoxygenated cyclohexane containing 0.04 g of triisobutylaluminum. The blender cup was then charged with 50 g of "Harwick" 50-R kaolinite clay (Harwick Standard Chemical Co., weight-average equivalent spherical particle diameter of 0.55 $\mu$) which has been dried at 600° C under 20 l/hr of 4:1 $N_2$:$O_2$ and cooled under $N_2$, followed by stirring. The viscosity was measured immediately with a Brookfield Synchro-Lectric RVT Viscometer using a No. 2 disk at a stirring rate of 10 RPM.

(B) The above experiment was repeated using 0.12 g of triisobutylaluminum.

(C) For comparison, the above experiment was repeated except that no triisobutylaluminum was present.

The following data were obtained.

|     | Triisobutylaluminum added, g | Viscosity, centipoises |
| --- | --- | --- |
| (A) | 0.04 | 60 |
| (B) | 0.12 | 20 |
| (C) | 0 (control) | 2000 |

EXAMPLE 2

Following the procedure of Example 1, 103 g of "Harwick" GK kaolinite clay (Harwick Standard Chemical Co., 53% of the particles have a weight-average equivalent spherical particle diameter of less than 2 $\mu$) dried at 600° C under 20 l/hr of 4:1 $N_2$:$O_2$ and cooled under $N_2$ was added to 550 ml of cyclohexane containing 0.16 g of triisobutylaluminum.

The following data were obtained.

| Triisobutylaluminum added, g | Viscosity, centipoises |
| --- | --- |
| 0.16 | 20 |
| 0 (control) | 1800 |

EXAMPLE 3

Following the procedure of Example 1, 132 g of pigmentary titania (Du Pont, "Ti-Pure" R-915 rutile), dried at 600° C for 18 hours under 30 l/hr of 4:1 $N_2$:$O_2$ and cooled under $N_2$, was added to 500 ml of cyclohexane containing 0.05 g of triisobutylaluminum.

The following data were obtained.

| Triisobutylaluminum added, g | Viscosity, centipoises |
| --- | --- |
| 0.05 | 240 |
| 0 (control) | 3600 |

EXAMPLE 4

Following the procedure of Example 1, 91 g of "Alcoa" C-333 alumina trihydrate (Aluminum Co. of America, screen analysis 99% through 325 mesh, 94–99% less than 30 $\mu$, 85–93% less than 20 $\mu$, 56–67% less than 10 $\mu$, 20–40% less than 5 $\mu$, median weight-average equivalent particle diameter of 6.5–9.5 $\mu$), dried at 160° C for 18 hours under nitrogen flow, was added to 500 ml of cyclohexane containing 0.04 g of triisobutylaluminum.

The following data were obtained.

| Triisobutylaluminum added, g | Viscosity, centipoises |
| --- | --- |
| 0.04 | 16 |
| 0 (control) | 200 |

EXAMPLES 5–9

Following the procedure of Example 1, a series of blender cups were charged with 500 ml of dry and deoxygenated cyclohexane and various amounts of various alkylaluminum compounds as indicated in the following table. To each blender cup was added 100 g of "Harwick" GK kaolinite clay dried at 600° C for 18 hours under 30 l/hr of 4:1 $N_2$:$O_2$ and cooled under $N_2$ flow.

The following results were obtained.

| Example | Alkylaluminum Type | Amount, g | Viscosity, centiposies |
| --- | --- | --- | --- |
| 5 | isoBu$_2$AlH | 0.7 | 20 |
| 6 | isoBu$_2$AlCl | 0.5 | 28 |
| 7 | Et$_3$Al | 0.7 | 16 |
| 8 | (n-C$_6$H$_{13}$)$_3$Al | 0.7 | 20 |
| 9 | (CH$_3$)$_3$Al | 0.3 | 36 |
| Control | — | 0 | 1580 |

EXAMPLE 10

Silica (Johns-Manville "Celite"-319 diatomaceous earth) was coated with $TiO_2$ by distilling 2–10 ml portions of $TiCl_4$ through a dried (300° C) bed of the silica between 1 inch layers of glass wool in a 2-liter beaker at 150° C. After purging at 150° C to remove excess $TiCl_4$, the silica was exposed to air to hydrolyze the absorbed $TiCl_4$.

A 1-liter autoclave was charged with a stirred, fluid uniform suspension of 40 g of $TiO_2$-coated silica prepared by adding mineral, dried at 500° C for 18 hours under 4:1 $N_2$:$O_2$ gas flow and cooled under $N_2$ flow, to 500 ml of deoxygenated and dried cyclohexane containing 100 mg of triisobutylaluminum. The mixture was stirred and an additional 500 mg of triisobutylaluminum was added. The polymerization was carried out at 70° C under 100 psi of ethylene for 8 hours. The product, which weighed 65 g and had an ash content of 71.15%, was hot compression molded to test bars which had the following properties:

| Tensile psi | 1428 | 1446 |
| --- | --- | --- |
| Modulus, psi | 277,000 | 235,000 |
| Elongation, % | 122 | 118 |
| 0° F Izod Impact (ft lb/in notch) | 3.3 | |

EXAMPLE 11

A batch of "Harwick" GK kaolinite clay having a natural content of $TiO_2$ was dried at 600° C under flow of dry nitrogen/oxygen 4/1 at 30 liters/hour for 13 hours and cooled under nitrogen to ambient temperature. A 500-ml batch of deoxygenated cyclohexane was passed through a bed of Woelm acid alumina and transferred under nitrogen blanket to a closed blender. The solvent containing 0.1 g of triisobutylaluminum was stirred and 40 g of the above clay was added followed by 0.15 g more of triisobutylaluminum.

The resultant clay suspension was transferred to a 1-liter stainless steel autoclave fitted with a magnetically driven stirrer. Ethylene was added and the mixture stirred and heated at 70° C and 100 psi ethylene pressure for 1 hour, 27 minutes. The autoclave was cooled, unreacted ethylene vented, and the reaction mixture filtered to recover 76.5 g of polyethylene/clay composite. Ash analysis showed the product contained 48.3% clay.

Test bars were prepared by heating the composite at 175° C for 3 minutes, followed by compression at 2000-psi pressure for 1 minute. These bars had the following properties:

| | | |
|---|---|---|
| Tensile (psi) | 3134 | 3028 |
| Elongation (%) | 471 | 422 |
| Modulus under tension (psi) | 463,100 | 509,500 |
| 0° F Izod impact (ft lb/in notch) | 4.9 | |

EXAMPLE 12

A batch of "Harwick" GK kaolinite clay was dried at 600° C under 30 liters/hour of 4:1 $N_2:O_2$ for 18 hours and cooled under nitrogen. A 1-liter autoclave was charged with a mobile suspension prepared by adding 60 g of the above clay to 600 ml of cyclohexane containing 0.18 g of diisobutylaluminum chloride followed by the addition of 0.53 g more of diisobutylaluminum chloride.

Polymerization was carried out at 70° C and 100 psi ethylene pressure for 2 hours and 46 minutes. The product, a powder, amounted to 106 g. A film pressed from the powder at 180° C. was strong and flexible. Compression molded test bars had the following properties.

| | | |
|---|---|---|
| Tensile (psi) | 2772 | 2784 |
| Modulus (psi) | 442,000 | 445,000 |
| Elongation (%) | 272 | 372 |
| 0° F Izod Impact | 1.4 | 1.4 |

EXAMPLE 13

A 400-g sample of "Harwick" GK kaolinite clay was placed in a beaker between two layers of glass wool. The assembly was heated at 300° C for 3 hours while purging with nitrogen The clay was cooled to 160° C, the nitrogen flow stopped, and a 10-ml portion of titanium tetrachloride placed in the bottom of the beaker by means of a long hypodermic needle and syringe. The titanium tetrachloride treatment was repeated after 2 hours. After vaporization of the titanium tetrachloride ceased, the clay was exposed to ambient air to permit complete hydrolysis.

The above-modified clay was dried by heating at 600° under 30 liters/hour flow of 4:1 nitrogen:oxygen for 18 hours. The dried clay was cooled under nitrogen.

A 50-g portion of the above clay was added under nitrogen purge to a blender cup with 350 ml of cyclohexane containing 100 mg of triisobutylaluminum. The mixture was stirred and 500 mg more of triisobutylaluminum was added. This mixture was then added to a 1-liter stirred autoclave, the autoclave was closed and connected to a source of ethylene. Ethylene was added and agitation and heating begun. Polymerization was effected at 70° C and 25–100 psi ethylene pressure for 1 hour and 18 minutes. The polyethylene/modified clay composite was collected by well-known filtering, w ashing and drying procedures. The dried product amounted to 73 g of very uniform powder and the total mineral content (ash) amounted to 55.7% by weight.

Compression molded test bars had the following physical properties: T, 3300 psi; $E_b$, 270%; $M_i$, 630,000 psi.

EXAMPLE 14

A 200-g batch of Engelhard "ASP"-400 kaolinite clay (Engelhardt Minerals Co., weight-average equivalent particle diameter of 4.8 $\mu$ range 0.7-20 $\mu$) was exposed, as in Example 13, to a mixture of vapors of 10 ml of titanium tetrachloride and 15 g of aluminum chloride. The modified clay was next exposed to ambient air to hydrolyze all unreacted chloride.

A mixture of 80 g of the above titania/alumina modified clay and 20 g of pigmentary titania (Du Pont "Ti-Pure" R-101 rutile, weight-average equivalent particle diameter of 0.18 $\mu$) in 100 ml of cyclohexane was ball-milled with steel balls for 1 day. The mineral mixture was collected by filtration, air-dried and finally heated at 400° C under 30 liters/hour flow of 3:1 nitrogen:oxygen. The dried mixture was heat to 400° C under 3:1 $N_2:O_2$ flow at 30 liters/hr and cooled from 200° C under nitrogen flow.

A 400-ml stainless steel shaker tube was dried by: (1) heating at 100° C for 1 hour under vacuum; (2) purging with 15 psi ethylene pressure for 5 minutes; (3) evacuating; and (4) repeating steps (2) and (3). The dried shaker tube was then charged with 150 ml of cyclohexane containing 0.79 g of triisobutylaluminum followed by 31 g of the above dry mineral mixture. The vessel was closed, ethylene was added and polymerization carried out at 80° C and 300 psi ethylene pressure for 6 hours. The polyethylene/mineral composite, collected by filtering, washing and drying, had 40.8% polyethylene according to carbon analysis.

Compression molded test bars had the following physical properties: T, 3100 psi; $E_b$, 195% $M_i$, 610,000 psi.

EXAMPLE 15

(A) 200-g batch of "Harwick" GK kaolinite clay, 60 g of "Kadox" 15 zinc oxide (N. J. Zinc Co., weight-average equivalent particle diameter of 0.11 $\mu$) mixed in 400 ml of cyclohexane was very viscous. Addition of 50 g of tetraisopropyl titanate and milling for 1 hour reduced the viscosity to essentially that of the solvent. Milling was continued for 3 hours, following which the clay/pigment mixture was collected by filtering, washing and drying at 500° C for 18 hours under 30 liters/hour of 4:1 nitrogen: oxygen and finally cooled under nitrogen.

(B) A suspension of 40 g of the dry clay/pigment mixture from Part (A) and 0.6 g of triisobutylaluminum in 250 ml of cyclohexane was charged into a shaker tube and heated at 70° C under 40–100 psi ethylene pressure for 1 hour and 18 minutes. The product, separated by filtration, washing and drying, amounted to 58 g and analyzed for 55.4% ash. Compression molded bars had the following physical properties: T, 3760 psi; $E_b$, 390%; $M_i$, 441,000 psi.

EXAMPLE 16

(A) A mixture of 270 g of "Harwick" GK kaolinite clay and 30 g of Du Pont "Ti-Pure" R-101 rutile was treat ed with 20 g of tetraisopropyl titanate in 400 ml of cyclohexane as described in Example 15. The clay/pigment mixture was dried at 600° C under 30 liters/hour flow of 4:1 nitrogen:oxygen for 18 hours and cooled under nitrogen.

(B) A 50-g portion of the dry clay/pigment mixture from Part (A) was added to 500 ml of cyclohexane containing 0.1 g of triisobutylaluminum and thoroughly mixed followed by the addition of 0.5 g more of triisobuylaluminum. This suspension was charged to an autoclave and heated under 40–100 psi ethylene pressure at 70° C for 0.32 hour. The product, isolated by filtering, washing and drying, weighed 79 g and had an ash content of 61.3%. Compression molded test bars had the following physical properties: T, 3090 psi; $E_b$, 190%; $M_i$, 612,000 psi; 0° F Izod impact , 7.0 ft lb/in notch.

EXAMPLE 17

The procedure of Example 15 was employed to prepare a mixture from 270 g of "Harwick" GK kaolinite clay, 15 g of zinc oxide ("Kadox"15) and 15 g of Du Pont R-101 "Ti-Pure" rutile and 40 ml of triisopropyl titanate in 400 ml of cyclohexane. The mixture was dried for 18 hours at 500° C under 30 liters/ hour 4:1 nitrogen:oxygen and cooled under nitrogen.

The polymerization mixture was prepared by adding in a dry and oxygen free blender cup 50 g of the above dry mixture to a solution of 0.1 g of triisobutylaluminum in 500 ml of cyclohexane. After stirring, 0.5 g more of triisobutylaluminum was added. Polymerization at 70° C/100 psi ethylene pressure for 29 minutes yielded 80 g of powdery free-flowing solid having an ash content of 59.0%. Compression molded test bars had the following properties: T, 3038 psi, $E_b$, 231%; $M_i$, 531,000 psi; 0°0 F Izod, 13 ft lb/in notch.

Titania-coated fuller's earth effected the polymerization of ethylene as follows: a 200-g batch of fuller's earth was coated with titania by tumbling a mixture of 200 g of the clay in 500 ml of cyclohexane and 80 ml of tetraisopropyl titanate in a rod mill for 1 day. The coated clay was collected by filtration, washed with cyclohexane and air-dried.

A 60-g batch of the above titania-coated clay was dried for 18 hours at 600° C. under 30 liters/hour flow of 4:1 $N_2:O_2$ and cooled under nitrogen.

The dried clay was next added to 600 ml of dry and deoxygenated cyclohexane containing 0.2 g of triisobutylaluminum. After stirring and adding 0.6 g more of triisobutylaluminium, the mixture was transferred to an autoclave. Polymerization was carried out at 70° C and 100 psi ethylene for 29 minutes and yielded 100 g of powder.

EXAMPLE 19

A 500-g batch of bentonite clay, 3 liters of water and 150 ml of concentrated nitric acid was made into a thick paste and allowed to stand overnight. Filtration required 2 days and washing with 3 liters of distilled water required 5 days.

Analysis: Bentonite starting material: Mg, 1.17%; K, 0.26%; Na, 1.46; Acid washed: Mg, 0.87%; K, 0.21%; Na, 0.23%.

A 100-g batch of the acid-washed bentonite was powdered to a pass a 200-mesh screen, then suspended in a solution of 150 ml of cyclohexane and 20 ml of tetraisopropyl titanate. The mixture was allowed to stand one week, the clay isolated by filtration and washed with cyclohexane and air-dried. The above clay was then dried at 600° C under 30 liters/hour of 4:1 $N_2O_2$ flow for 18 hours and cooled under nitrogen.

A 50-g batch of the above dried, titania-coated, acid-washed bentonite clay was added to 700 ml of cyclohexane containing 0.2 g of triisobutylaluminum. The mixture was treated with 0.4 g more of triisobutylaluminum and added to a 1-liter autoclave. The polymerization of ethylene was carried out at 70° C and 100 psi ethylene pressure for 6 minutes. The product amounted to 82 g of soft 2-mm pellets and contained 48.8% ash. The physical properties of compression molded test bars were as follows:

| Tensile (psi) | 3769 | 3868 |
|---|---|---|
| Modulus (psi) | 327,200 | 350,000 |
| Elongation (%) | 97 | 79 |
| 0° F Izod Impact (ft lb/in of notch) | 3.9 | |

EXAMPLE 20

(A) When 60 g of tetraisopropyl titanate was added to a stirred suspension of 150 g of "Harwick" GK kaolinite clay and 150 g of "Alcoa 38 C-30 BF $Al_2O_3.3H_2O$ (1–3% on 200 mesh, 15–20% on 325 mesh, 80–85% through 325 mesh) in 400 ml of cyclohexane, the viscosity dropped to that of the solvent. The mixture was rod-milled (glass) for 1 day. The solid was collected by filtration, washed with cyclohexane, exposed to air, and dried at 175° C for 18 hours under 30 liters per hour of nitrogen flow. The product was not exposed to air or moisture before use.

(B) A 50-g portion of the dried mixture of part (A) was added to 500 ml of cyclohexane containing 0.1 g of triisobutylaluminum. The mixture was stirred and 0.5 g more of triisobutylaluminum was added. The polymerization was carried out in a 500 ml autoclave at 70° , 100 psi ethylene for 1.2 hours. The product amounted to 77 g of powder with an ash content of 48.64% which represents 64.3% hydrated minerals. A pressed film could be creased without cracking.

Compression molded test bars had the following properties:

| Tensile, psi | 2,340 | 2,564 |
|---|---|---|
| Modulus, psi | 561,000 | 528,000 |
| Elongation, % | 218 | 296 |
| Izod impact, ft lb/in of notch | 0° F, 10 | |
| Oxygen index | 0.276 | |
| Flex strength, psi | 3,573 | 3,663 |
| Flex modulus, psi | 437,000 | 393,000 |

EXAMPLE 21

(A) A mixture of 35% "Alcoa" C-30 BF $Al_2O_3.3H_2O$ and 65% Georgia Kaolin "Hydrite" MP kaolinite clay (weight-average equivalent particle diameter of 9 $\mu$, range 1.5–35 $\mu$) was prepared as given in Example 20(A) and dried at 175° C for 18 hours under 30 liters per hour of nitrogen flow.

(B) A suspension of the above dry material was prepared as follows and added to the reactor. Deoxygenated cyclohexane (500 ml) was passed through a bed of Woelm acid alumina into an enclosed blender cup under nitrogen purge. To this was added 0.1 g of triisobutylaluminum and 70 g of the mineral mixture prepared in part (A) above. The mixture was stirred while 0.6 g of additional triisobutylaluminum was added. The suspension was transferred under pressure into a dry 400-ml shaker tube under nitrogen purge. Shaking was started and ethylene (100 psi) added at 70° C. The polymerization required 57 minutes and gave 94 g of powder having an ash content of 60.04% which represents 76% hydrated minerals. A pressed film was tough and cold-drawable.

Compression molded test bars had the following properties:

| | | |
|---|---|---|
| Tensile, psi | 2,083 | 2,071 |
| Modulus, psi | 873,000 | 857,000 |
| Elongation, % | 156 | 127 |
| Heat deflection temperature | | |
| (at 264 psi) | 86° C | |
| Izod impact. | 0° F, 3.5 | |
| ft lb/in of notch | −40° F, 1.0 | |
| Flex strength, psi | 4,145 | 3,831 |
| Flex modulus, psi | 830,000 | 625,000 |
| Oxygen index | 0.365 | |

The embodiment of the invention in which an exclusive property or privilege is claimed are as follows:

1. The method of preparing a high solids dispersion of finely divided inorganic filler compound in a liquid hydrocarbon diluent under low viscosity conditions which comprises
   (a) mixing the hydrocarbon diluent with 0.01–2% by weight, based on the inorganic filler compound, of an organoaluminum compound selected from the group consisting of trialkylaluminums, trialkylaluminum hydrides, dialkylalumunimun alkoxides, alkylaluminum halides and polymeric hydrocarbylaluminums in which the alkyl groups, alike or different, contain 1–10 carbon atoms, and
   (b) dispersing at least 9 weight/volume percent of the inorganic filler compound as a slurry in the mixture of hydrocarbon diluent and organoaluminum compound.

2. The method of claim 1 in which the organoaluminum compound is selected from the group consisting of trialkylaluminums, dialkylaluminum hydrides, dialkylaluminum alkoxides and dialkylaluminum halides.

3. The method of claim 1 in which the finely divided inorganic filler compound has a weight-average equivalent spherical particle diameter of less than 100 μ.

4. The method of claim 3 in which the dispersion contains at least 15 weight/volume percent of finely divided inorganic filler compound.

5. The method of claim 4 in which the organoaluminum compound is an alkylaluminum compound and is present in the amount of 0.05 to 1% by weight based on the filler compound.

6. The method of claim 5 in which the hydrocarbon diluent has 5 to 8 carbon atoms.

7. The method of claim 6 in which the finely divided inorganic filler compound has a weight-average equivalent spherical particle diameter of less than 50 μ.

8. The method of claim 7 in which the dispersion contains at least 20 weight/volume percent of finely divided inorgaic filler compound.

9. The method of claim 8 in which the finely divided inorganic filler compound is aluminum silicate clay.

10. The method of claim 8 in which the finely divided inorganic filler compound is alumina trihydrate.

11. The method of claim 8 in which the alkylaluminum compound is a dialkylaluminum hydride.

12. The method of claim 8 in which the alkylaluminum compound is a trialkylaluminum.

13. A method of preparing a polyolefin in the presence of a high solids dispersion of finely divided inorganic filler compound in a liquid hydrocarbon diluent under los viscosity conditions which comprises
   (a) mixing the hydrocarbon diluent with 0.01–2% by weight, based on the inorganic filler compound, of an organoaluminum compound selected from the group consisting of trialkylaluminums, dialkylalkylaluminum hydrides, dialkylaluminum alkoxides, alkylaluminum halides and polymeric hydrocarbylaluminums in which the alkyl groups, alike or different, contain 1–10 carbon atoms,
   (b) dispersing at least 9 weight/volume percent of the inorganic filler compound as a slurry in the mixture of hydrocarbon diluent and organoaluminum compound, said dispersion containing a transition metal compound component of a coordination polymerization catalyst system,
   (c) adding to the dispersion an olefin selected from the group consisting of 1-alkenes of 2–10 carbon atoms and mixtures thereof with agitation at a temperature from 0° to 250° C and a pressure from atmospheric to 500 atmospheres, and
   (d) isolating the product.

14. The method of claim 13 in which the organoaluminum compound is selected from the group consisting of trialkylaluminums, dialkylaluminum hydrides, dialkylaluminum alkoxides and dialkylaluminum halides.

15. The method of claim 13 in which the transition metal compound is interacted at the surface of the finely divided inorganic filler compound in an amount sufficient to provide 0.01 to 2% by weight of transition metal based on the filler compound.

16. The method of claim 15 in which the finely divided inorganic filler compound has a weight-average equivalent spherical particle diameter of less than 100 μ.

17. The method of claim 16 in which the organoaluminum compound is an alkylaluminum compound and is present in the amount of 0.05 to 1% by weight based on the filler compound.

18. The method of claim 17 in which the finely divided inorganic filler compound is aluminum silicate clay.

19. The method of claim 17 in which the finely divided inorganic filler compound is alumina trihydrate.

* * * * *